United States Patent
Nguyen

(10) Patent No.: US 8,341,326 B2
(45) Date of Patent: Dec. 25, 2012

(54) SOFTWARE LAYER FOR COMMUNICATION BETWEEN RS-232 TO I2C TRANSLATION IC AND A HOST

(75) Inventor: Dong Nguyen, San Jose, CA (US)

(73) Assignee: NXP B.V., Eindhoven (NL)

( * ) Notice: Subject to any disclaimer, the term of this patent is extended or adjusted under 35 U.S.C. 154(b) by 725 days.

(21) Appl. No.: 11/993,388

(22) PCT Filed: Jun. 30, 2006

(86) PCT No.: PCT/IB2006/052212
§ 371 (c)(1),
(2), (4) Date: May 13, 2010

(87) PCT Pub. No.: WO2007/004178
PCT Pub. Date: Jan. 11, 2007

(65) Prior Publication Data
US 2010/0235555 A1    Sep. 16, 2010

Related U.S. Application Data

(60) Provisional application No. 60/696,363, filed on Jun. 30, 2005.

(51) Int. Cl.
*G06F 13/36* (2006.01)
(52) U.S. Cl. .................... 710/315; 710/305; 710/104
(58) Field of Classification Search .............. 710/315, 710/305–306, 104, 100
See application file for complete search history.

(56) References Cited

U.S. PATENT DOCUMENTS

| | | | |
|---|---|---|---|
| 5,897,663 | A | 4/1999 | Stancil |
| 6,205,504 | B1 | 3/2001 | Faust et al. |
| 6,400,729 | B1 | 6/2002 | Shimadoi et al. |
| 2003/0081289 | A1 | 5/2003 | Oomori et al. |

FOREIGN PATENT DOCUMENTS

| | | |
|---|---|---|
| JP | 11-275170 A | 10/1999 |
| JP | 2000172597 A | 6/2000 |
| JP | 2002-543521 A | 12/2002 |
| JP | 2003-110184 A | 4/2003 |
| JP | 2004-208003 A | 7/2004 |

(Continued)

OTHER PUBLICATIONS

Anonymous: Micro Computer Control Co. User's Guide "I2C Bus Host Adapter Variable Clock Rate with iPort Utility Pack Software", 44pgs.(Sep. 29, 2004).*

(Continued)

*Primary Examiner* — Brian Misiura
*Assistant Examiner* — Kim Huynh

(57) ABSTRACT

A host controller having a first communication interface, or protocol, writes to and reads from one or more slave devices each having a second communication interface, or protocol, which is different from the first, through a translation device, or integrated circuit, that is responsive to command streams from the host controller. The present invention provides a high-level communications protocol by which command information and data are passed to a translation device, and the translation device interprets these commands and engages in the desired data transfer operation between the host controller and the slave devices. In a further aspect of the present invention, the high-level communications protocol also includes commands interpreted by the translation device to achieve data transfers between the host controller and the translation device, including accessing internal registers and I/O ports of the translation device.

15 Claims, 3 Drawing Sheets

FOREIGN PATENT DOCUMENTS

| | | |
|---|---|---|
| JP | 2004-320260 A | 11/2004 |
| JP | 2005-033296 A | 2/2005 |
| JP | 2006-504948 A | 2/2006 |
| WO | 00/67126 A1 | 11/2000 |
| WO | 2004/040240 A1 | 5/2004 |

OTHER PUBLICATIONS

Micro Computer Control Co., "iPort/AI, RS-232 to I2C Host Adapter w/ ASCII Interface, Model MIIC-202, V2.00, User's Guide", 58 pgs. (2002).

Micro Computer Control Co. User's Guide "I2C Bus Host Adapter Variable Clock Rate with iPort Utility Pack Software", 44 pgs. (Sep. 29, 2004).

Micro Computer Control Co "RS-232 to I2C Host Adapter ASCII Interface With IPort Utility Pack Software" Sep. 29, 2004, MCC, Downloaded From: http://www.mcc-us.com/MIIC-202-UG.pdf.

\* cited by examiner

1. WRITE N BYTES TO SLAVE DEVICE
   HOST SENDS

| S CHAR. | SLAVE ADR. + W | NO. OF BYTE | DATA 0 | ... | DATA N-1 | P CHAR. | ─ 202

─ 200

2. READ N BYTE FROM SLAVE DEVICE
   HOST SENDS

| S CHAR. | SLAVE ADR. + R | NO. OF BYTE | P CHAR. | ─ 204

TRANSLATOR RESPONSES

| DATA 0 | DATA N-1 | ─ 206

3. WRITE TO TRANSLATOR INTERNAL REGISTERS

| W CHAR. | REGISTER 0 | DATA 0 | ... | REGISTER N | DATA N | P CHAR. | ─ 208

4. READ FROM TRANSLATOR INTERNAL REGISTERS

| R CHAR. | REGISTER 0 | ... | REGISTER N | P CHAR. | ─ 210

TRANSLATOR RESPONSES

| DATA 0 | DATA N | ─ 212

5. WRITE TO OUTPUT PORT

| O CHAR. | DATA | ─ 214

6. READ FROM OUTPUT PORT

| I CHAR. | ─ 216

TRANSLATOR RESPONSES

| DATA | ─ 218

7. REPEAT START - READ AFTER WRITE

| S CHAR. | SLAVE ADR. + W | NO. OF BYTE | DATA 0 | ... | DATA N | S CHAR. | SLAVE ADR. + R | NO. OF BYTE | P CHAR. | ─ 220

8. REPEAT START - WRITE AFTER READ

| S CHAR. | SLAVE ADR. + R | NO. OF BYTE | S CHAR. | SLAVE ADR. + W | NO. OF BYTE | DATA 0 | ... | DATA N | P CHAR. | ─ 222

FIG. 2

SOFTWARE LAYER FOR COMMUNICATION BETWEEN RS-232 TO I2C TRANSLATION IC AND A HOST

The present invention relates generally to methods and apparatus for communicating between a host and one or more slave devices through a bus translation bridge. The present invention relates more particularly to communication protocols for instructing the bus translation, or bridge, device regarding data transfer operations.

Advances in semiconductor manufacturing technologies have led to the integration many individual circuit elements on integrated circuits. In turn, this capability has provided designers with the opportunity to create a wide range systems and system-level components. Some of these system-level blocks are used to provide communication, or data transfer, functionality. For example, a Universal Asynchronous Receiver Transmitter (UART) may provide a serial communications pathway in accordance with the RS-232 standard. Similarly, the I2C serial communication protocol may also be implemented in an integrated circuit.

RS-232 and I2C provide well-known and well-defined hardware specifications; and they have been in use for years by many applications in the electronics industry. There are integrated circuits such as UART or I2C controllers that allow the integration of these two different hardware communication protocols into a system as separate, individual integrated circuits.

Some integrated circuits, such as, for example, microcontrollers, may include a functional block that allows communication in accordance with a protocol such as RS-232, or I2C. Similarly, some peripheral, or slave devices, are adapted to communicate in accordance with a single protocol, such as the RS-232, or I2C protocol.

What is needed is a means for a host controller, adapted to communicate in accordance with a first protocol, to engage in data transfer operations with one or more slave devices, which communicate in accordance with a second protocol, by way of high-level software command streams.

Briefly, embodiments of the present invention provide for a host controller having a first communication interface, or protocol, to write to and read from one or more slave devices each having a second communication interface, or protocol, which is different from the first. Embodiments of the present invention further provide a high-level communications protocol by which command information and data are passed to a translation, or bridge, device, and the translation device interprets these commands to achieve the desired data transfer operation between the host controller and the slave devices.

In a further aspect of the present invention, the high-level communications protocol also includes commands interpreted by the translation device to achieve data transfers between the host controller and the translation device.

FIG. 2 illustrates a plurality of command streams of a software layer protocol in accordance with the present invention.

Figure 1:
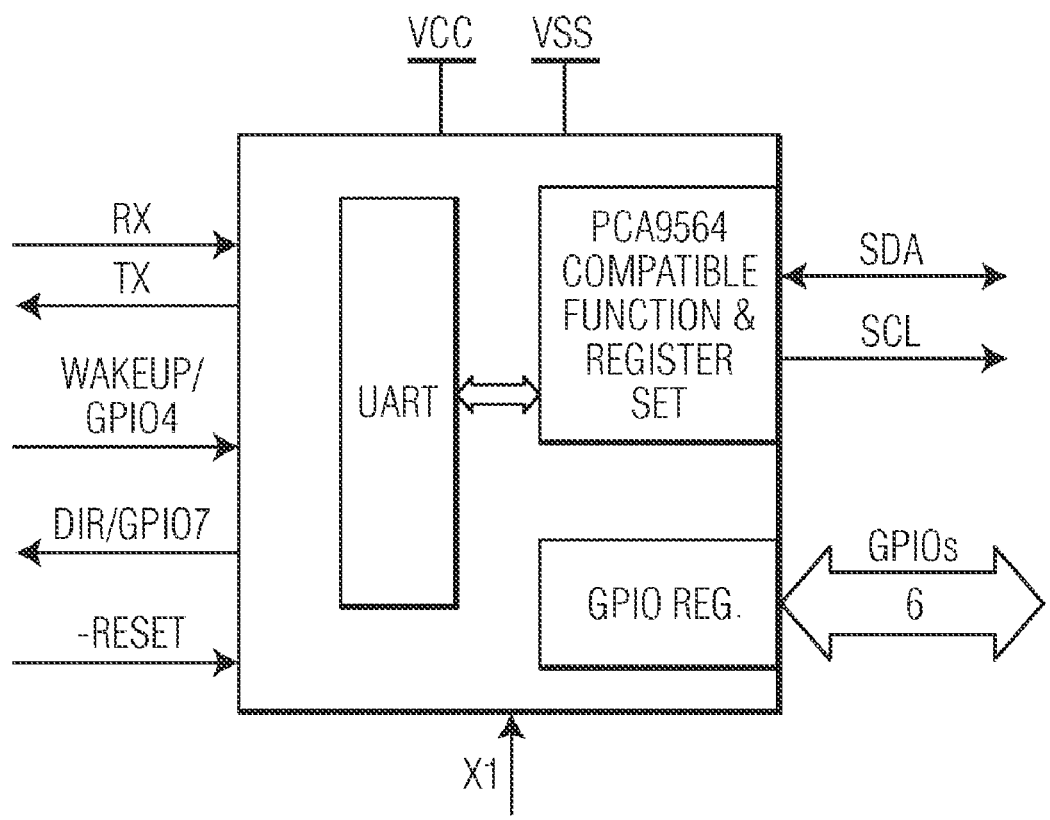
FIG. 1 is a block diagram of an integrated circuit having an RS-232 interface and an I2C interface, suitable for use in embodiments of the present invention.

Generally, embodiments of the present invention include a translation device, operable to communicate in accordance with both a first and a second hardware communications protocol, which engages in data transfer operations with one or more slave devices, which communicate in accordance with a second protocol, by way of high-level software command streams received from a host controller that communicates in accordance with the second protocol. In typical embodiments, the first protocol is RS-232, and the second protocol is I2C.

Conventionally, in order to add I2C master support to a system, an I2C controller such as the Philips PCA9564 is used. However, adding such a device to a system may require the host to dedicate a significant number of pins to add this I2C master support. Since an undesirably large number of pins of the host may be required to be dedicated to achieving such functionality, and because pins on a microcontroller are generally considered to be a scarce resource, this type of an arrangement may be undesirable.

However, the integration of two different hardware communication protocols into a single integrated circuit (IC) allows a system incorporating such an integrated circuit to provide support for, e.g., I2C master capability through an RS-232 interface. This type of an integrated circuit may be referred to as a translation device, or a bridge device. Such an integrated circuit may be implemented in any suitable manner, including but not limited to, a microcontroller programmed to provide the appropriate communication interfaces, or an application specific integrated circuit having dedicated special purpose circuitry to provide the communication interfaces. In addition to the hardware layer there is also a software layer, in accordance with the present invention, that allows a host to communicate with this translation device through an I2C-like RS-232 protocol in ASCII format.

Reference herein to "one embodiment", "an embodiment", or similar formulations, means that a particular feature, structure, operation, or characteristic described in connection with the embodiment, is included in at least one embodiment of the present invention. Thus, the appearances of such phrases or formulations herein are not necessarily all referring to the same embodiment. Furthermore, various particular features, structures, operations, or characteristics may be combined in any suitable manner in one or more embodiments.

The terms integrated circuit (IC), semiconductor device, monolithic device, microelectronic device, and chip are often used interchangeably in the field of electronics generally. The present invention is applicable to all the above as they are generally understood in the field.

ASCII refers to the American Standard Code for Information Interchange.

The terms single-chip microcomputer, microcontroller, embedded controller, embedded processor and similar variants are often used interchangeably in this field and are generally meant to include single-chip digital data processing devices.

The term, pins, as used herein, refers to the various terminals of a packaged integrated circuit which are electrically connected to components external to the integrated circuit.

Embodiments of the present invention take advantage of the small pin count needed to establish an RS-232 link between a host controller and a translation device, or integrated circuit, and further include an ASCII-like command interface, or software layer protocol between the host controller and the translation device.

Referring to FIG. 1, a block diagram of an illustrative translation device is shown. The RS-232 interface is on the left hand side, and consists of two signals: RX, TX. RX and TX are required signals and are needed to send data to, and receive data from, the host controller. I2C master capable signals are shown on the right hand side of the translation device. These signals are labelled as SDA and SCL. Signal X1 is needed to provide clocking to the device, and the rest of the signals: —RESET, GPIOs (i.e., general purpose input/outputs) are optional and might be designed out if not needed for a particular embodiment. Vcc and Vss refer to the power and ground nodes respectively.

Still referring to FIG. 1, a UART functional block and an I2C functional block are shown along with an internal communication path therebetween. Those skilled in the art and having the benefit of this disclosure will appreciate that the illustrative translation device also includes control logic (not shown) for interpreting the ASCII codes and control information, and for managing the data transfers as described more fully below.

Referring to FIG. 2, a software protocol 200 for communicating between an RS-232 to I2C translation, or bridge, device, and a host controller is illustrated. A command stream 202 generated by a host controller and transmitted to the RS-232 to I2C translation device for writing a number, N, of bytes from the host to a slave device that is coupled to the translation device, includes a first ASCII character, e.g., "S", indicating that the command stream describes an operation to be performed with a slave device that is coupled to the translation device. Command stream 202 further includes a slave address where bit 0 of the address byte is at the 0 state. This zero state is represented by the letter "W", indicating that a write operation is to be performed. Command stream 202 further includes an indication of the amount of data to be transferred, e.g., the number of bytes of data (N). It will be appreciated that, although bytes are a convenient grouping of data bits with which to work, the present invention contemplates any suitable scheme for representing the amount of data to be written, whether bits, nibbles, bytes, half-words, words, double-words, or any other suitable quantification of an amount of data. In the illustrative command stream 202, N data bytes follow the indication of N data bytes. Subsequent to the transmission of the N data bytes, an ASCII character, e.g., "P", is provided by the host controller indicating the end of command stream 202.

In operation, command stream 202 is received by the translation device, which interprets the ASCII characters and control information and, responsive thereto, writes the N data bytes to the specified slave device.

A command stream 204 generated by the host controller and transmitted to the translation device for reading a number, N, of bytes from a slave device that is coupled to the translation device, and transferring those bytes to the host, includes a first ASCII character, e.g., "S", indicating that command stream 204 describes an operation to be performed with a slave device. Command stream 204 further includes a slave address, where bit 0 of the address byte is at the 1 state. This 1 state is represented by the letter "R", indicating that a read operation is to be performed. Command stream 204 further includes an indication of the amount of data to be transferred, for example, the number of bytes. Command stream 204 further includes an ASCII character, e.g., "P", indicating the end of command stream 204.

In operation, command stream 204 is received by the translation device, which interprets the ASCII characters and control information and, responsive thereto, reads N data bytes from the specified slave device, and transfers those bytes to the host. An illustrative data stream 206 indicates the response provided by the translation device to the host.

A command stream 208 generated by the host controller and transmitted to the translation device for writing to one or more of the internal registers of the translation device, includes a first ASCII character, e.g., "W", indicating an internal register write operation. Command stream 208 further includes one or more pairs of register address and register data. The register address indicates which of the internal registers of the translation device is to receive the data that is provided in association with the register address. In the illustrative command stream 208, N+1 pairs (i.e., 0 through N) of register address and data to be written are shown. Command stream 208 further includes an ASCII character, e.g., "P", indicating the end of command stream 208.

In operation, command stream 208 is received by the translation device, which interprets the ASCII characters and control information and, responsive thereto, receives the register addresses and associated data, and writes the data to the specified internal registers of the translation device.

A command stream 210 generated by the host controller and transmitted to the translation device for reading one or more internal registers of the translation device, and transferring those register contents to the host, includes a first ASCII character, e.g., "R", indicating that command stream 210 describes at least one read operation to be performed with the translation device. Command stream 210 further includes one or more register addresses, indicating that a read operation is to be performed on those internal registers whose addresses have been specified, and the contents of those registers transferred to the host device. Command stream 210 further includes an ASCII character, e.g., "P", indicating the end of command stream 210. A data stream 212 illustrates a transfer of internal register contents from the translation device to the host, responsive to command stream 210.

A command stream 214 generated by the host controller and transmitted to the translation device for writing a character to a port of the translation device, includes a first ASCII character, e.g., "O", indicating a write to port operation. Such a port may be an output port or an input/output (I/O) port.

In operation, command stream 214 is received by the translation device, which interprets the ASCII character and, responsive thereto, receives the associated data, and writes the data to an I/O port of the translation device. In this illustrative embodiment, the port width is eight bits. However, various embodiments of the present invention may have port widths that are smaller or larger than eight bits. In an alternative embodiment, in which the translation device includes two or more output ports command stream 214 can be modified to include one or more port addresses so as to specify which output ports are to be written.

A command stream 216 generated by the host controller and transmitted to the translation device for reading a port of the translation device, and transferring the input data to the host, includes a first ASCII character, e.g., "I", indicating that command stream 216 describes an input operation to be performed on a port of the translation device. Such a port may be an input port or an input/output (I/O) port. Data stream 218 illustrates data obtained from a port of the translation device and transmitted to the host, responsive to command stream 216. In an alternative embodiment, in which the translation device includes two or more input ports, command stream 216 can be modified to include one or more port addresses so as to specify which input ports are to be read.

Command stream 220 represents a combination of commands issued from the host to the translation device. It is noted that in this command stream example (referred to as a read after write command stream), a write operation, which transfers data to a slave device through the translation device, and a read operation, which retrieves data from a slave device through the translation device, are both specified. No termination character, e.g., "P" is used between the specification of the write and read operations.

In operation, command stream 220 is received by the translation device, which interprets the ASCII characters and control information and, responsive thereto, writes the N data bytes to the slave device at the specified slave address, and then reads a specified number of bytes from the slave device at the slave address specified for reading. In some embodiments, the translation device buffers the command stream 220 until the termination character, or code, (e.g., "P") is received. In this way multiple operations may be specified to the translation device. In some embodiments, the translation device may begin performing a data transfer operation as soon as enough information has been received from the host to do so.

Command stream 222 represents a combination of commands issued from the host to the translation device. It is noted that in this command stream example (referred to as a write after read command stream), a read operation, which retrieves data from a slave device through the translation device, and a write operation, which transfers data to a slave device through the translation device, are both specified. No termination character, e.g., "P" is used between the specification of the write and read operations.

In operation, command stream 222 is received by the translation device, which interprets the ASCII characters and control information and, responsive thereto, reads a specified number of data bytes from the slave device at the specified slave address, and then writes a specified number of bytes from the translation device to the slave device at the slave address specified for writing. In some embodiments, the translation device buffers the command stream 222 until the termination character, or code, (e.g., "P") is received. In this way multiple operations may be specified to the translation device. In some embodiments, the translation device may begin performing a data transfer operation as soon as enough information has been received from the host to do so.

In further alternative embodiments, a broadcast command stream may be generated by the host controller and transmitted to the translation device. Such a command stream includes a character, or code, such as, but not limited to the ASCII code for "S" to indicate an operation to be performed with slave devices. Such a broadcast may further include a character, or code, such as but not limited to the ASCII code for "B", and may further include one or more bytes of data which are to be written to all the slave devices coupled to the translation device. Similarly, a multi-cast command stream may be generated by the host and transmitted to the translation device. Such a multicast command stream provides a list of slave device addresses (typically two or more, but less than all) to which data is to be written. Both the broadcast and multi-cast command streams are similar to command stream 202 except that multiple slave devices are to receive the specified data from the translation device.

In the illustrated embodiment of the present invention, the hardware communication protocol between the translation device and the slave devices, is different than the hardware communication protocol between the translation device and the host controller. More particularly, the hardware communication protocol between the translation device and the slave devices is I2C, and the hardware communication protocol between the translation device and the host is RS-232.

Figure 3:
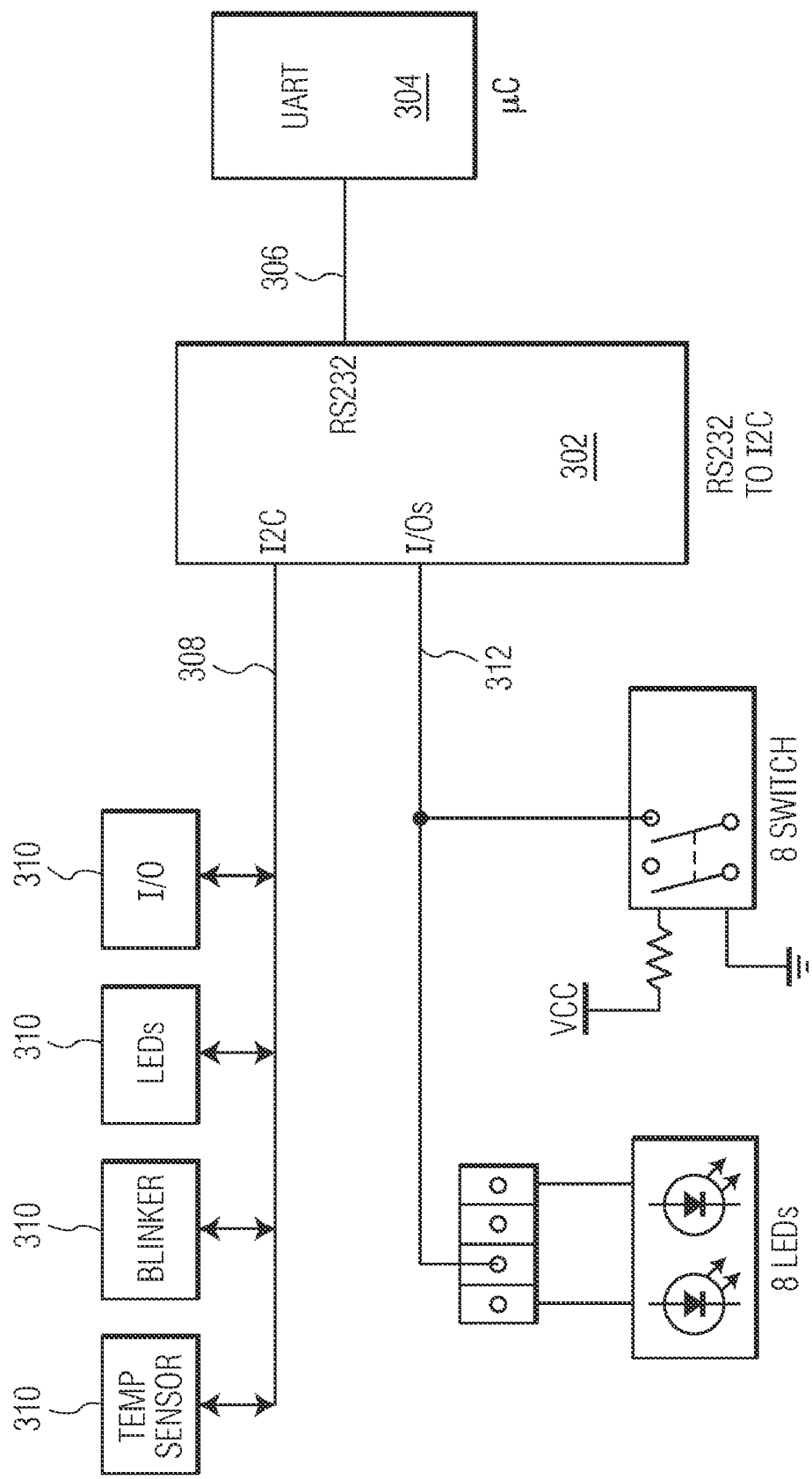
FIG. 3 is a schematic block diagram of an exemplary system in which the present invention is incorporated.

Referring to FIG. 3, an illustrative embodiment of the present invention provides an RS-232 to I2C translation device 302 that is coupled to a host controller 304 by way of an RS-232 hardware communication interface 306. Host controller 304 typically includes a UART functional block by which it interfaces to translation device 302. A plurality of slave devices 310 are coupled to translation device 302 by way of an I2C hardware interface 308. Host controller 304 controls slave devices 310 (such as but not limited to Temperature Sensor, LED Blinker, and LEDs), by sending control commands through the RS-232 to I2C translation device. Translation device 302 is further coupled various peripheral devices by way of its I/O port lines 312.

Described herein are methods and apparatus for communicating with and controlling a plurality of slave devices adapted to communicate by way of an interface that is different from the communications interface of a host controller.

Various embodiments of the present invention include a translation device, or integrated circuit, that is adapted to receive high level command streams from a host controller, engage in data transfer operations with the slave devices on behalf of the host controller, and to provide data from the slave device to the host controller as requested. Typical embodiments of the present invention include an I2C interface between the slave devices and the translation device, and an RS-232 interface between the translation device and the host controller.

It is to be understood that the present invention is not limited to the embodiments described above, but encompasses any and all embodiments within the scope of the subjoined Claims and their equivalents.

What is claimed is:

1. A method of communicating between an RS-232 to $I^2C$ translation integrated circuit (IC) having a plurality of slave devices coupled thereto, and a host coupled to the translation IC, the translation IC further including a plurality of internal registers, and at least one input/output (I/O) port, comprising:

receiving, at the translation IC, a first command stream from the host, the translation IC processing the first command stream to determine that the first command stream includes a first code indicating that a data transfer operation with at least one slave device is to be performed, a slave address, a second code indicating that the data transfer operation is a write to the slave address, an indication of the amount of data to be transferred, the indicated amount of data, and a third code indicating the end of the command stream; and writing the indicated amount of data to the slave device at the specified slave address;

wherein communication between the host and the translation IC is in accordance with a first hardware protocol, and communication between the translation IC and the plurality of slave devices is in accordance with a second hardware protocol;

receiving, at the translation IC, a second command stream from the host, the translation IC processing the second command stream to determine that the second command stream includes a first code indicating that a data transfer operation with at least one slave device is to be performed, a slave address, a fourth code indicating that the data transfer operation is a read from the slave device at the slave address, an indication of the amount of data to be transferred, and a third code indicating the end of the second command stream;

reading the indicated amount of data from the slave device at the specified slave address; and transferring the data read from the slave device at the specified slave address to the host;

receiving, at the translation IC, a third command stream from the host, the translation IC processing the third command stream to determine that the third command stream includes a fifth code indicating that a data transfer operation with at least one I/O port is to be performed, and data to be transferred; and writing the data to the I/O port.

2. The method of claim 1, further comprising:

receiving, at the translation IC, a fourth command stream from the host, the translation IC processing the fourth command stream to determine that the fourth command stream includes a sixth code indicating that a data transfer operation with at least one I/O port is to be performed; reading the I/O port; and transferring data read from the I/O port to the host.

3. The method of claim 2, wherein the first, third, fifth, and sixth codes are ASCII characters.

4. The method of claim 3, wherein the translation IC is a microcontroller.

5. A translation device, comprising:
an integrated circuit adapted to communicate in accordance with a first physical communications protocol through a first set of pins; the integrated circuit further adapted to communicate in accordance with a second physical communications protocol through a second set of pins;
wherein the integrated circuit is further adapted to receive a plurality of command streams via the first set of pins, interpret those command streams, and responsive to at least a first one of the command streams, communicate via the second set of pins with at least one slave device specified by the first one of the command streams, and manage a data transfer operation between the first set of pins and the at least one specified slave device;
wherein the translation device further comprises at least one port, and wherein the translation device, responsive to at least a third one of the command streams, manages a data transfer between the first set of pins and the at least one port.

6. The translation device of claim 5, wherein the data transfer comprises extracting data from the first one of the command streams, and transferring that data to the at least one specified slave device.

7. The translation device of claim 5, wherein the data transfer comprises reading data from the at least one specified slave device, and transferring that data to the first set of pins.

8. The translation device of claim 5, wherein the translation device further comprises a plurality of internal registers, and wherein the translation device, responsive to at least a second one of the command streams, manages a data transfer between the first set of pins and at least one of the plurality of internal registers.

9. The translation device of claim 5, wherein the translation device is a microcontroller, and wherein the at least one port is an input/output (I/O) port.

10. A system, comprising:
a host controller, adapted to communicate in accordance with a first physical communications protocol through a first set of host controller pins;
a translation device, adapted to communicate in accordance with the first physical communications protocol through a first set of translation device pins, and having the first set of translation device pins coupled to the first set of host controller pins; the translation device further adapted to communicate in accordance with a second physical communications protocol through a second set of translation device pins; and
a plurality of slave devices, each slave device adapted to communicate in accordance with the second physical communications protocol through a respective first set of slave device pins, each of the respective first sets of slave device pins coupled to the second set of translation device pins;
wherein the translation device is further adapted to receive a plurality of command streams from the host controller, interpret those command streams, and responsive to at least a first one of the command streams, communicate with at least one slave device specified by the first one of the command streams, and manage a data transfer operation between the host controller and the at least one specified slave device;
wherein the translation device further comprises at least one port, and wherein the translation device, responsive to at least a third one of the command streams, manages a data transfer between the host controller and the at least one port.

11. The system of claim 10, wherein the data transfer comprises extracting data from the command stream and transferring that data to the at least one specified slave device.

12. The system of claim 10, wherein the data transfer comprises reading data from the at least one specified slave device and transferring that data to the host controller.

13. The system of claim 10, wherein the translation device further comprises a plurality of internal registers, and wherein the translation device, responsive to at least a second one of the command streams, manages a data transfer between the host controller and at least one of the internal registers.

14. The system of claim 10, wherein the host controller comprises a first microcontroller and the translation device comprises a second microcontroller.

15. The system of claim 14, wherein the at least one port is an input/output (I/O) port.

* * * * *